United States Patent [19]
Cox

[11] Patent Number: 5,321,781
[45] Date of Patent: Jun. 14, 1994

[54] OPTICAL FIBER ARRANGEMENT FOR UNIFORMLY ILLUMINATING A SPACE REGION BEYOND A FIBER END

[75] Inventor: Laurence J. Cox, Stanmore, England
[73] Assignee: GEC-Marconi Limited, England
[21] Appl. No.: 925,555
[22] Filed: Aug. 4, 1992
[30] Foreign Application Priority Data
  Aug. 6, 1991 [GB] United Kingdom ............... 9116942.5
[51] Int. Cl.⁵ ............................................... G02B 6/34
[52] U.S. Cl. ........................................ 385/36; 385/39
[58] Field of Search ....................... 385/36, 37, 38, 39, 385/42

[56] References Cited

U.S. PATENT DOCUMENTS

| | | | |
|---|---|---|---|
| H855 | 12/1990 | Otto et al. | 385/36 |
| 3,926,501 | 12/1975 | Hama | 350/96 B |
| 4,411,521 | 10/1983 | Jourdan et al. | 356/225 |
| 4,422,714 | 12/1983 | Benoit et al. | 350/96.15 |
| 4,482,994 | 11/1984 | Ishikawa | 385/37 X |
| 4,699,453 | 10/1987 | Roberts | 350/96.20 |
| 5,146,516 | 9/1992 | Blümke et al. | 385/36 |

FOREIGN PATENT DOCUMENTS

| | | |
|---|---|---|
| 0164170 | 12/1985 | European Pat. Off. ............. 385/36 |
| 0262878 | 4/1988 | European Pat. Off. . |
| 0091607 | 5/1986 | Japan ........................... 385/36 |
| WO83/01311 | 4/1983 | PCT Int'l Appl. . |
| 2174214 | 10/1986 | United Kingdom . |

*Primary Examiner*—John D. Lee
*Assistant Examiner*—Phan T. Heartney
*Attorney, Agent, or Firm*—Kirschstein, Ottinger, Israel and Schiffmiller

[57] ABSTRACT

An optical fiber arrangement providing uniform illumination of a region in a plane beyond the end of an optical fiber and normal to the fiber axis. An array (12) of four prisms (A,B,C,D) is disposed adjacent to, but spaced from, an end (11) of an optical fiber (5). By appropriate choice of the prism angle ($\theta$) and its spacing (d) from the fiber (5), the prism array (12) modifies the angular distribution of light from the fiber (5) in two ways. The shape of the illuminated region is changed from circular to square and the illumination becomes substantially constant over the square region. In an assembly of fibers, each modified in this way, the amount of overlap needed between the outputs of neighbouring fibers can thus be reduced and a more uniform light output can be achieved. Other non-circular regions of illumination, for example of pentagonal and hexagonal shape, can be produced using different optical components and the same benefits obtained.

17 Claims, 7 Drawing Sheets

OPTICAL FIBER ARRANGEMENT FOR UNIFORMLY ILLUMINATING A SPACE REGION BEYOND A FIBER END

BACKGROUND OF THE INVENTION

1. Field of the Invention

This invention relates to optical fibre arrangements in which one or more optical fibres or bundles of optical fibres provide illumination or collect radiation at the fibre ends.

2. Description of Related Art

Since an optical fibre has a circular cross-section, and assuming it terminates with a normal end-face, its angular response function (radiation characteristic) is circularly symmetric. The response falls off with increasing angle with respect to the fibre axis. FIG. 1 shows a typical response curve for one plane containing the fibre axis. It will be appreciated that by virtue of the symmetry essentially the same curve will be obtained for any plane containing the fibre axis. FIG. 2(a) shows a computer-generated 3D model of the characteristic and FIG. 2(b) a corresponding contour map. Similar characteristics are obtained for a bundle of fibres end, as used herein, any reference to an optical fibre is to be taken to include a bundle of optical fibres, unless the context requires otherwise. In FIG. 2(b), the contours represent steps of 10 per cent change from the peak response (at the fibre axis 15), the map axes indicating the angle a ray makes with the axis 15 in two orthogonal planes containing the axis 15. The apparent non-uniformities in the response for different planes containing the fibre axis are attributable to errors in the modelling process.

In many applications the circular symmetry in the radiation characteristic is undesirable. One such application uses an assembly of fibres to illuminate a region which is of greater extent than can be covered by a single fibre. However, the individual fibres must be arranged so that the outputs of neighbouring fibres overlap in order to ensure that there are no 'holes', i.e. areas of inadequate illumination, in the combined output. This problem arises whether the fibres are arranged parallel to one another, for example to illuminate a planar surface, or the fibres are angularly spaced so as to cover an angular field greater than that which can be covered by a single fibre. The situation is illustrated, by way of a simplified example, in FIG. 3, in which response contours 1,2,3 corresponding to 25% of the peak light output are shown for three equi-angularly spaced fibres. The shaded overlap areas 4 ensure that no significant part of the triangular region defined by the three fibre axes receives illumination at a level which is below 75% of the peak output of the individual fibres. Although the illumination may fall slightly below the 75% level at the mid-points of the overlap areas 4, dependent on the individual fibre characteristics, it is otherwise substantially uniform at this level within the triangular region.

SUMMARY OF THE INVENTION

It is an object of the present invention to provide an optical fibre arrangement suitable for use in such an assembly of optical fibres in which the overlap between the outputs of neighbouring fibres can be reduced.

According to one aspect of the present invention, there is provided an optical fibre arrangement comprising an optical fibre and optical means adapted to refract or reflect radiation transmitted by the fibre and positioned adjacent an end of the fibre to modify the radiation characteristic of the fibre for both transmitted and received radiation, the optical means comprising a plurality of faceted elements arranged so that the radiation characteristic is different in different planes containing the fibre axis. The optical means has no diffusing effect on the radiation.

Preferably, the modified radiation characteristic is of substantially constant magnitude throughout a non-circular region beyond said end of the fibre. This region may be planar and normal to the fibre axis.

Preferably, the region has substantially the shape of a polygon, which may be a regular polygon, for example a square.

The faceted elements may be provided by prism means adapted to distribute radiation within said region. Each faceted prism element may be adapted to deflect a respective part of the radiation within said region according to the angular direction of said part with respect to the fibre axis. The facets may be planar, but this is not essential and the prism facet profiles may be tailored to suit the particular application. If said region is a polygon, the number of prism facets will equal the number of sides of the polygon.

As alternatives to prism means, said optical means may comprise faceted lens means or faceted mirror means adapted to distribute radiation within said region.

The spacing between said optical means and the end of the fibre preferably lies in the range of one half to two fibre diameters.

According to another aspect of the present invention, there is provided an optical fibre assembly comprising a plurality of optical fibre arrangements, each as aforesaid, wherein the optical fibres are spaced apart from one another in such manner that their respective non-circular regions extend continuously throughout a larger region. The non-circular regions do not necessarily all have the same shape. The larger region may be non-planar, for example, spherical or part-spherical, the non-circular regions then suitably comprising an array of complementary pentagons and hexagons.

BRIEF DESCRIPTION OF THE DRAWINGS

One embodiment of the invention will now be described, by way of example only, with reference to the accompanying drawings, in which.

DETAILED DESCRIPTION OF THE PREFERRED EMBODIMENTS

In accordance with the invention it is proposed to modify the radiation characteristic of the fibre by positioning at least one optical component adjacent an end of the fibre which component has the effect of refracting or specularly reflecting radiation transmitted by the fibre. The modification is such as to make the characteristic different in different planes containing the fibre axis (c.f. the natural characteristic which is the same for all such planes). In the specific embodiment to be described the optical component comprises a prism means 12, shown in a perspective view in FIG. 4.

Figure 4:
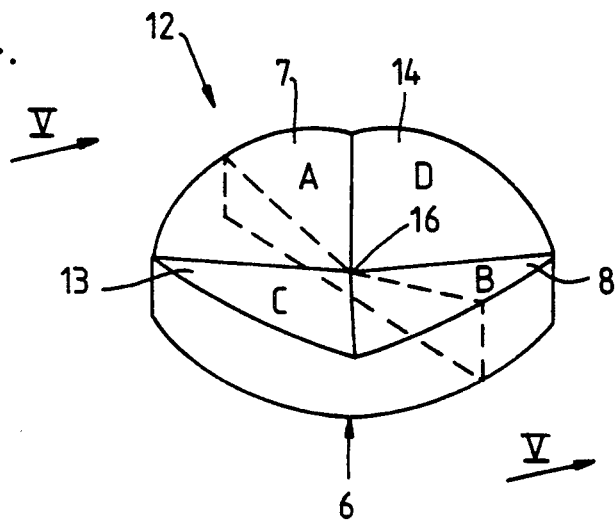
FIG. 4 is a perspective view of a prism means for use in the embodiment of the invention to be described.

Referring to FIG. 4, the prism means 12 is generally disc-shaped, having two major faces. One major face 6 is planar. The other major face is 'concave' and comprises four identically-shaped planar facets 7, 8, 13, 14. The four facets are arranged in an inverted pyramid-like formation meeting at a central point 16. Since the facets are planar, the thickness at the circular edge of the prism 'disc' is not constant; hence the non-circular appearance of the uppermost outer edge in FIG. 4. The prism means 12 may be viewed as comprising an intimately packed (in this example integral) array of four 'quadrant'—shaped prisms, labelled A,B,C, and D in FIG. 4.

Figure 5:
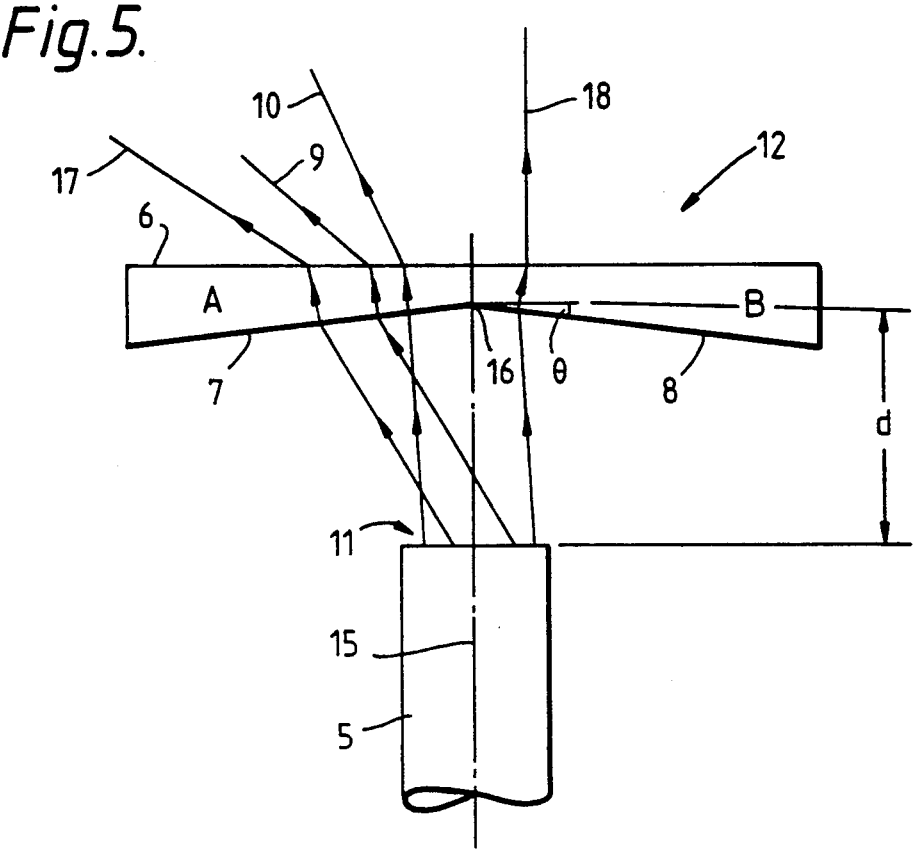
FIGS. 5 and 6 show the prism means disposed at two positions adjacent the end of an optical fibre and the effect of the prism means on the fibre output.

In FIG. 5 the prism means 12 (shown in the sectional plane V—V of FIG. 4) is arranged 'adjacent' a normal end face 11 of an optical fibre 5. The centre 16 of the prism means 12 is aligned with the fibre axis 15 and lies a distance d from the fibre end 11. The sectional plane V—V bisects the facets 7 and 8 of prisms A and B respectively (see FIG. 4). All four prisms have the same prism angle $\theta$, that is, in this example, the maximum angle which the prism facet makes with the major face 6 of the prism means.

In the following description it is assumed that light is emerging from the fibre so as to provide illumination. It will be appreciated that the same effects apply to light entering the fibre via the prism means 12. Light rays can naturally emerge from all points on the fibre end face 11 and at a range of angles with the fibre axis 15, the radiation characteristic defining the distribution of radiation among all such possible rays. Rays 9,10,17 and 18 are drawn, by way of example, to show the general effect of the prism means 12. Rays 9 and 17 emerge parallel from the fibre end, but from positions on opposite sides of the axis 15; rays 9 and 17 strike the same prism facet 7. Rays 10 and 18 also emerge parallel from the fibre, again on opposite sides of the axis 15, but at such a small angle to the axis that they strike different facets 7 and 8 even at the substantial fibre prism spacing d shown. Rays at a considerable angle to the axis 15, for example rays 9 and 17, tend to strike the same facet even though they originate from opposite sides of the axis. All four rays are refracted in directions away from the fibre axis 15. It can be seen, therefore, that the prism means 12 has a general diverging effect, reducing the intensity of the emitted radiation in the vicinity of the fibre axis 15 whilst increasing the intensity away from the axis.

The actual deviation experienced by each ray can, of course, be determined in accordance with known laws of optics from the angle the ray makes with a normal to the prism facet on which it is incident. Significantly, the amount of refraction is dependent on the plane containing both the fibre axis and the point of incidence of the ray on the prism facet. This dependence arises from the fact that the angle $\theta$ of the prism means is different in different planes containing the fibre axis, and causes the circular symmetry of the fibre radiation characteristic to be modified. In the sectional plane V—V of FIG. 4, the angle $\theta$ has a maximum value. The angle decreases in a manner determined by the prism shape to a minimum value in the planes containing the 'radial' facet edges. In the simple case of a planar facet (as shown in FIG. 5), the angle $\theta$ is constant in any given plane, i.e. it is the same for all points of incidence of a ray on the facet in that plane. However this feature is not essential and, indeed, is unlikely to be ideal, as will be explained later.

Figure 6:
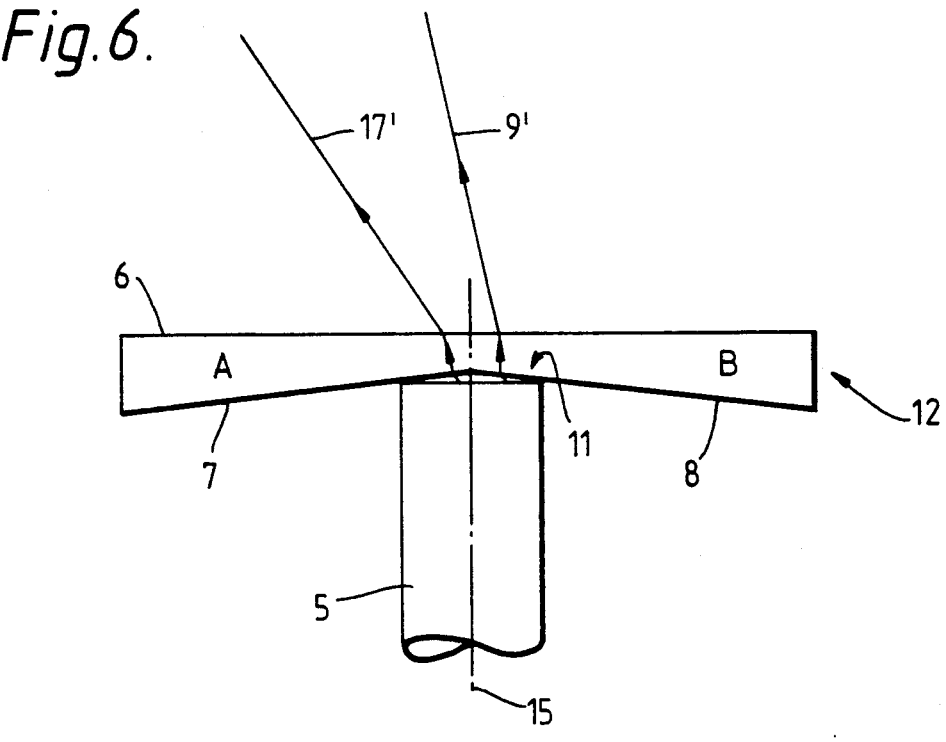

In FIG. 6, the prism means 12 is shown in contact with the fibre end 11, with the centre 16 again aligned with the fibre axis 15. In this arrangement, ray 9', emerging from the fibre at the same point and at the same angle as ray 9 in FIG. 5, strikes facet 8 of prism B and is refracted to emerge at a smaller angle to the axis 15. The prism means 12 thus acts to reduce the deviation from the axis 15 of ray 9'. Ray 17', on the other hand, which is initially parallel to ray 9' but emerges from the fibre to the left of the axis 15 (as ray 17 in FIG. 5), strikes facet 7 of prism A and is refracted, as in FIG. 5, to emerge at a greater angle to the axis 15. The prism means 12 thus acts to increase the deviation from the axis 15 of ray 17'. Clearly, when immediately adjacent the fibre end the prism means has a 'diverging' effect on some rays and a 'converging' effect on other rays. It will be apparent that in this case the angular direction of a ray is not determinative of how its path will be affected by the prism means, because it is not certain which of the four prism facets the ray will strike.

Figure 7A:
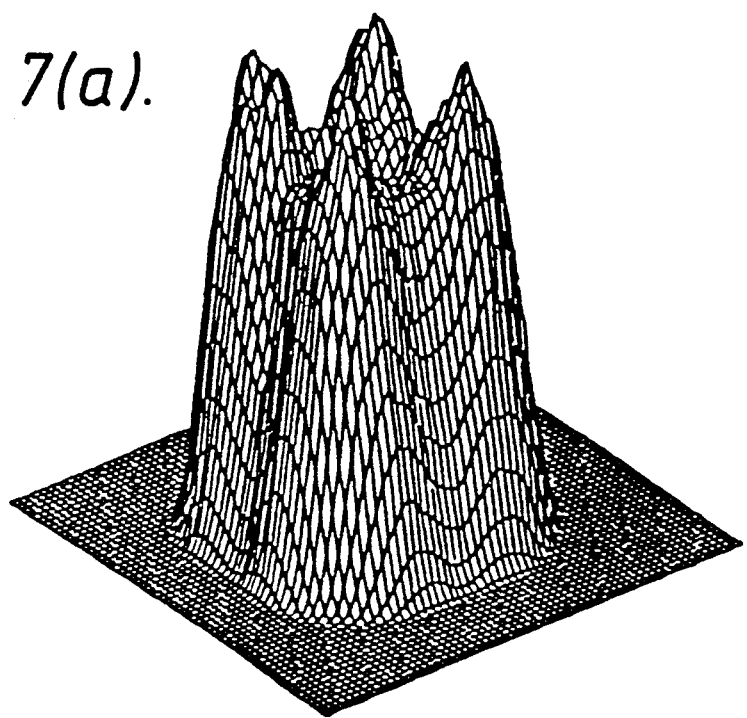
FIG. 7(a) and 7(b) show how the radiation characteristic of the fibre is modified when the prism means is at a first position with respect to the fibre end.
Figure 7B:
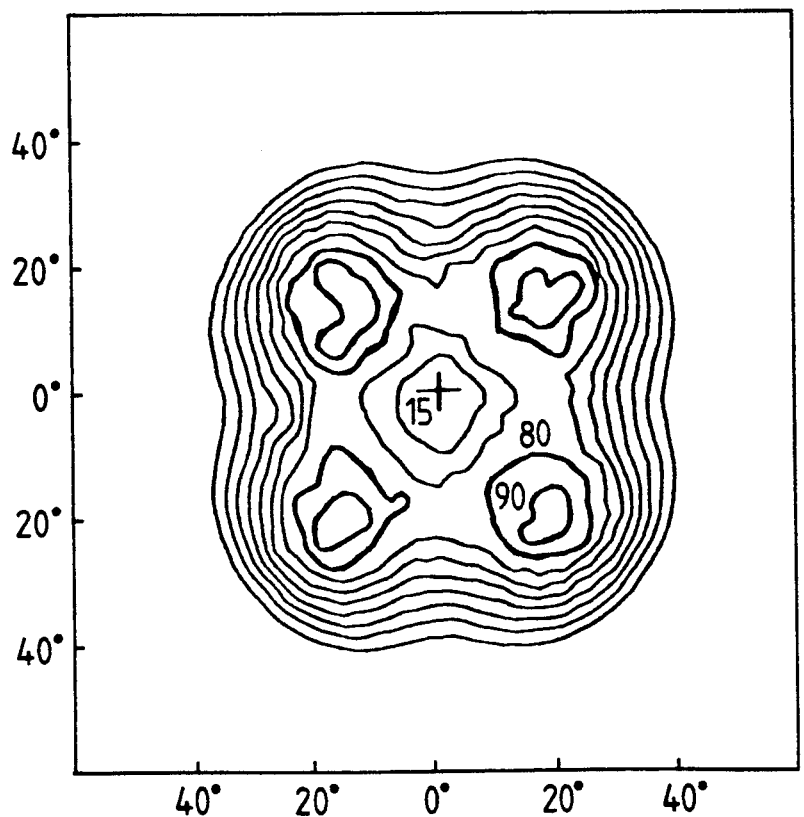

However, as the prism means is moved away from the fibre end (as, for example, to the position shown in FIG. 5) there is increasing correlation between the angular direction of a ray and the prism facet the ray will strike. For example, referring to FIG. 5, it is apparent that any ray parallel with ray 9, for example ray 17, will strike facet 7. This is clearly not true for all rays parallel with ray 10, which emerges from the fibre at a smaller angle with the axis 15 than ray 9. For example, ray 18, parallel with ray 10, strikes facet 8, not facet 7. However, it is evident that if the distance d is increased the same result will eventually be obtained, i.e. all rays parallel with ray 10, such as for example ray 18, will become incident on facet 7. The effect is that when the distance d is large compared with the fibre diameter, the angular direction of the ray alone determines the facet that it will strike, for almost all angles. This leads to a radiation characteristic in which rays at all angles except very small angles are refracted away from the fibre axis, giving a 'hole' in the characteristic, i.e. a fall-off in the response, centred on the axis 15. Furthermore, as explained above, by virtue of the variation in the angle $\theta$ for different planes containing the fibre axis, the amount of refraction is dependent on the angular position of the point of incidence of the ray on the prism means in a plane normal to the fibre axis. Such a characteristic is shown in FIG. 7. FIG. 7(a) shows a 3D model and FIG. 7(b) a contour map, in which, as previously, the contours represent steps of 10 per cent change from the peak response. The 80% and 90% contours have been emboldened to emphasise the change. There are four peaks in the response, one per prism facet, with the 'hole' between the four peaks.

Figure 1:
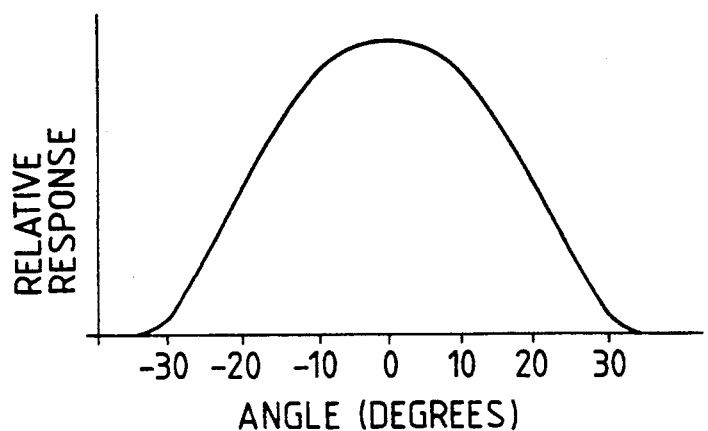
FIGS. 1, 2(a) and 2(b) (referred to above) show the typical radiation characteristics of a conventional optical fibre.
Figure 3:
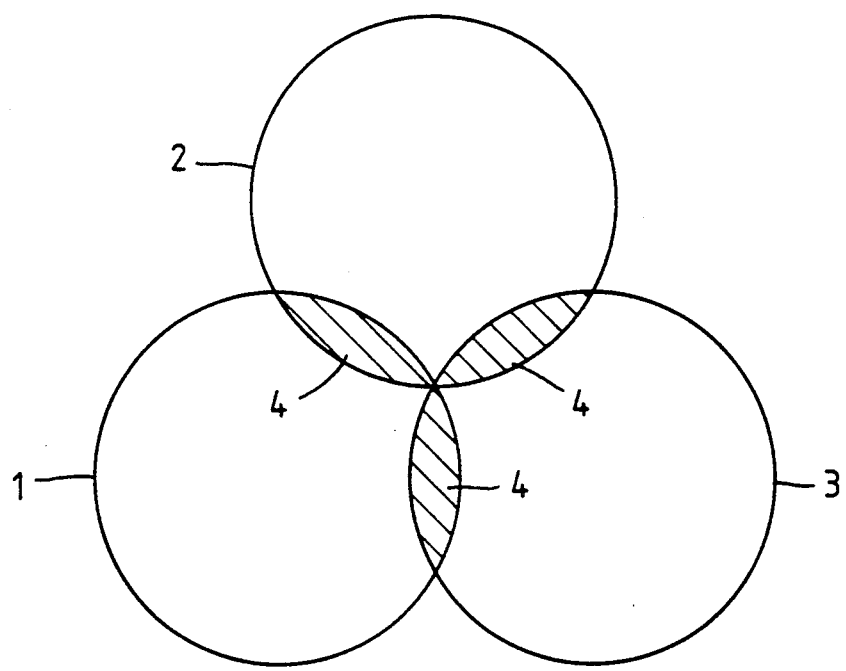
FIG. 3 (referred to above) shows the overlap required between the outputs of three equi-angularly spaced fibres.
Figure 2A:
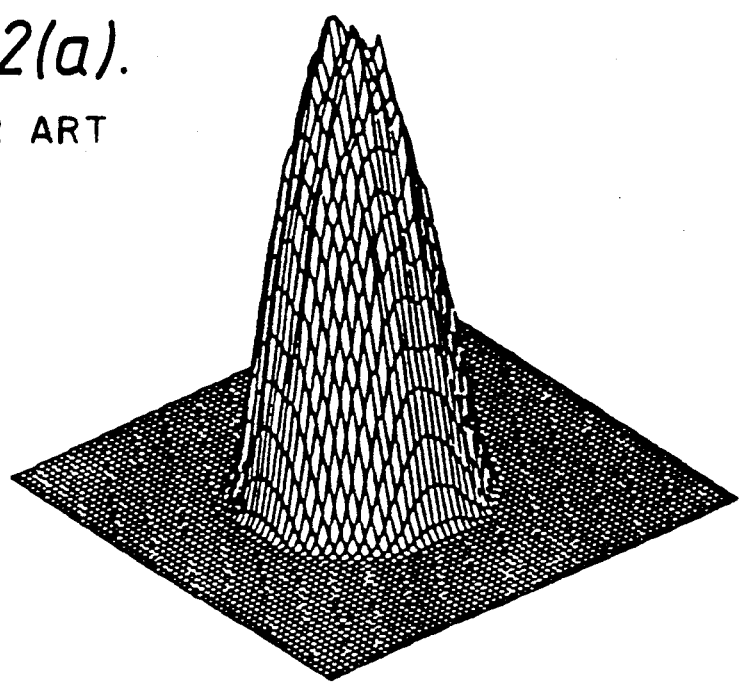
Figure 2B:
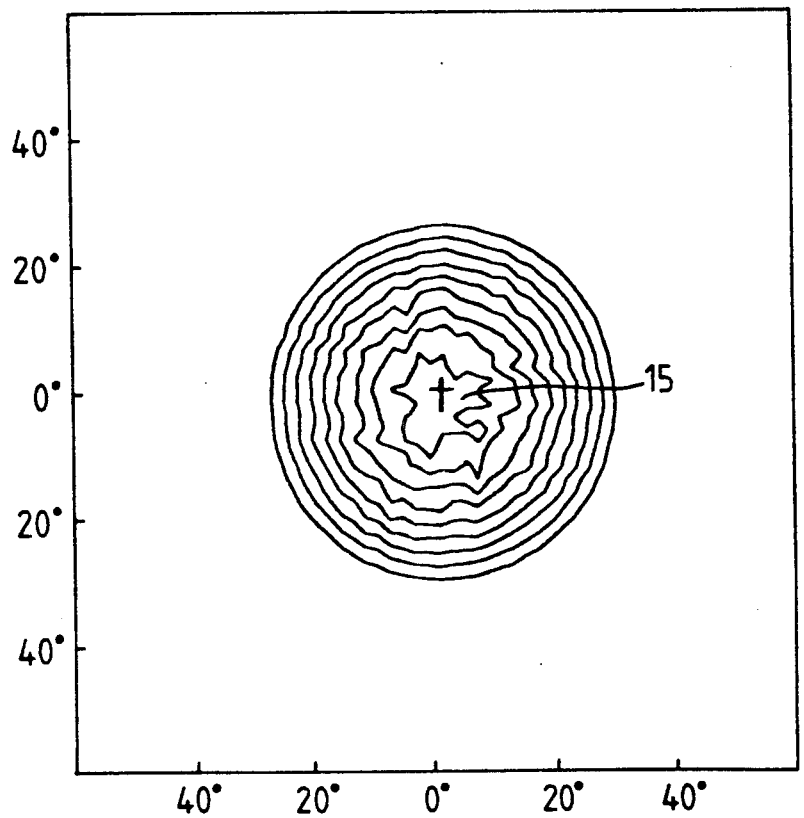

It can also be seen from FIG. 7 that, except for the four peaks, the effect of the prism means is to modify the shape of the response contours from circular (as in FIG. 2(b)) to substantially square. The characteristic is thus no longer circularly symmetric in the sense that it is now different in different planes containing the fibre axis, The two pairs of diagonally opposing peaks in the 'squared' characteristic lie on lines which bisect the prism facets. The peaks occur at the corners of the 'square' outer contours in planes where the angle $\theta$, and therefore the amount of refraction, is greatest.

Figure 8A:
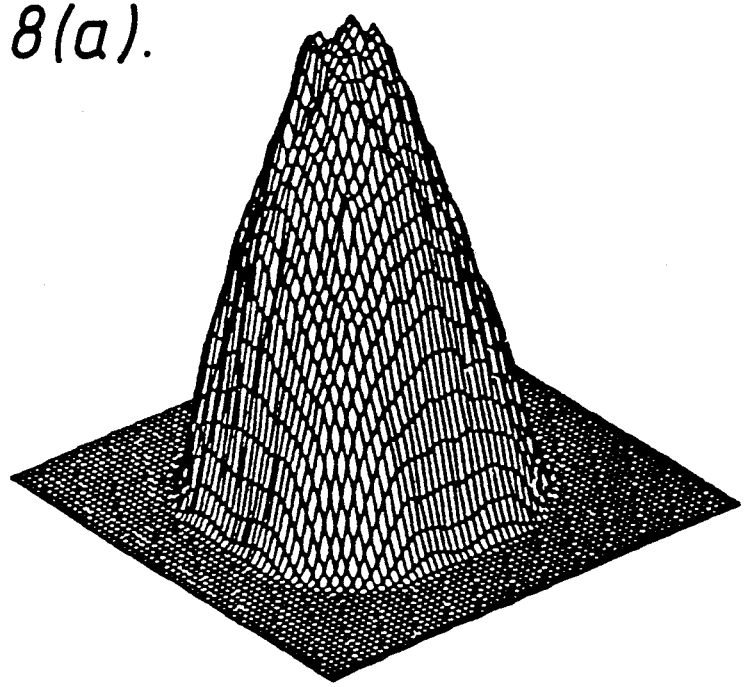
FIG. 8(a) and 8(b) show the modified radiation characteristic of the fibre when the prism means is at a second position.
Figure 8B:
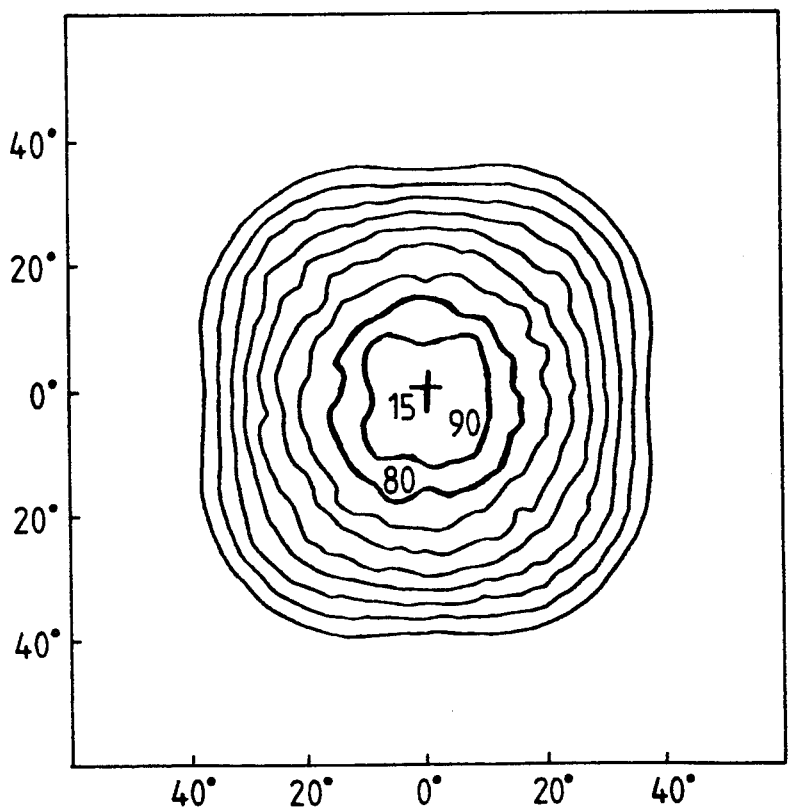

At a much smaller spacing d between the fibre end and the prism means, the characteristic begins to resemble that of the unmodified fibre (FIG. 2), having a single central peak. One such characteristic is shown in FIGS. 8(a) and 8(b). Nonetheless, the shape of the outer contours has again been modified from circular to substantially square.

Figure 9A:
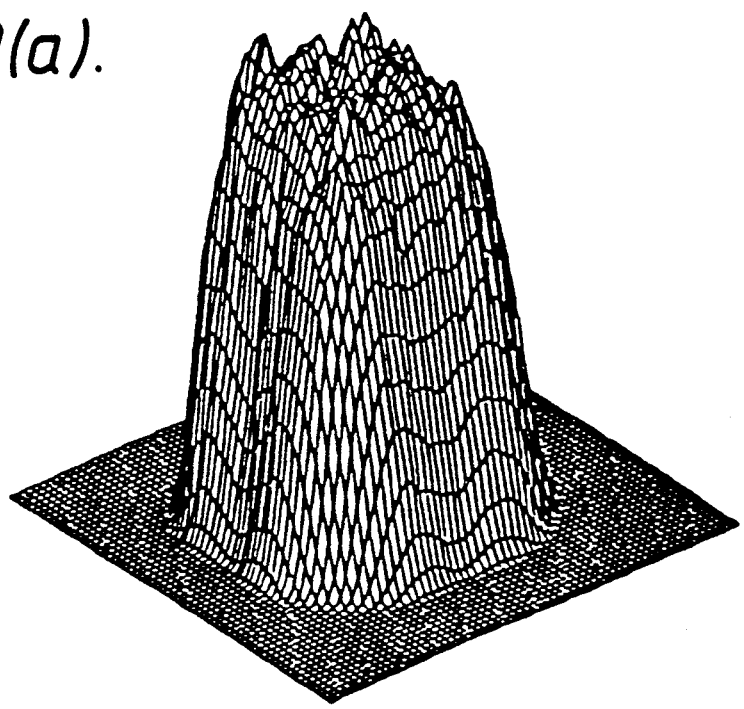
FIG. 9(a) and 9(b) show the modified characteristic when the prism means is at a third, preferred, position.
Figure 9B:
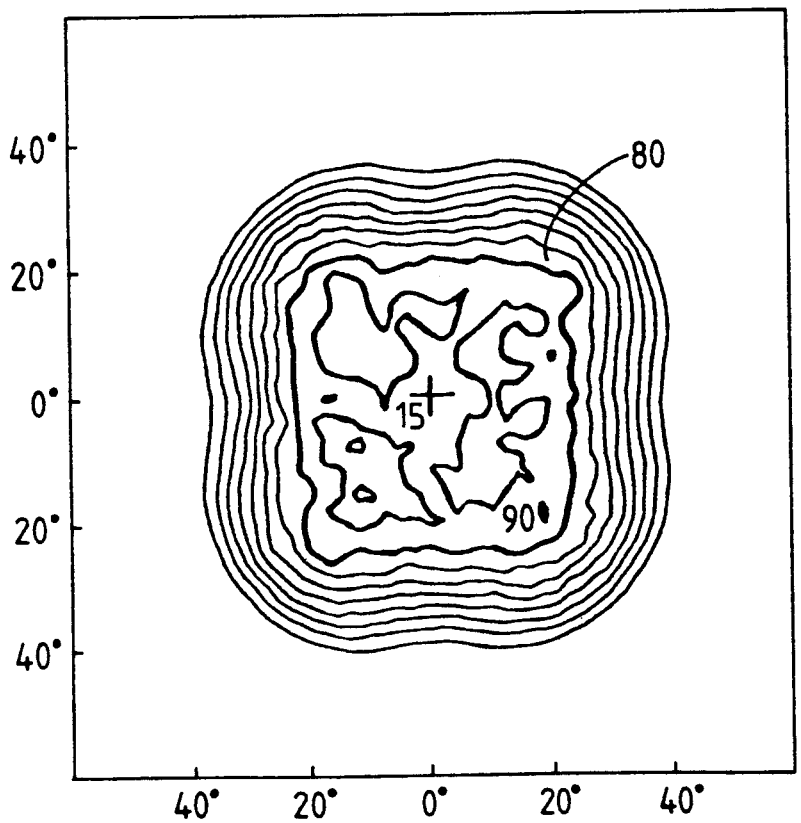

At a spacing d intermediate the values in these last two examples, typically about a fibre diameter, and preferably in the range of one half to two fibre diameters, dependent on the prism angle $\theta$, the central region of the characteristic is flatter with no significant peaks. This characteristic is shown in FIGS. 9(a) and 9(b) and provides a substantially uniform response, i.e. a constant illumination, over the central region.

The latter arrangement, in which uniform illumination is provided by the modified fibre over a non-circular (in this example, square) region, represents a highly useful result in practice. Such an arrangement is particularly suited for use in an assembly of fibres arranged, as mentioned previously, to illuminate a greater region than is possible using a single fibre, The non-circular nature of the individual regions illuminated allows a significant reduction in the overlap of the outputs of neighbouring fibres. This reduction can be made without introducing 'holes' in the greater region, in which the output falls below an acceptable level, because the individual, square, regions of uniform illumination can extend continuously throughout the larger region without substantial overlap. Moreover, the uniformity of the output of each individual fibre beneficially prevents the production of 'hot spots' in the total output. The operation for a bundle of fibres is in effect that of one large fibre and consequently the spacing requirements relate to the diameter of the bundle rather than one fibre.

Whereas in the described embodiment the prism means has four facets and produces square response contours, it will be appreciated that contours of other shapes may be generated with suitable modification of the prism means. Generally, the contours will have the shape of a polygon, regular or non-regular, with the number of prism facets required being equal to the number of sides of the polygon. Triangles, pentagons, hexagons and trapezoids are likely to prove the most useful shapes in practice, i.e., with a number of sides between 3 and 6.

The region to be illuminated by the assembly of fibres may be planar or non-planar. In the case of a non-planar region in particular, it will be apparent that the most efficient coverage may be provided by a complementary pattern of individual regions which do not all have the same shape. For example, in the case of a spherical or part-spherical region an array of complementary pentagons and hexagons arranged in the known manner of 'tiling' will generally be most suitable.

Whilst it is envisaged that the output of an individual fibre will be uniform over a planar region which is normal to the fibre axis, this is not essential. The prism means may thus be modified to provide illumination over a 'tilted' or non-planar region. However, in most cases where it is required to illuminate a non-planar region using a plurality of fibres, the radius of curvature will be such that there is no significant consequence if the individual component regions are planar.

Figure 10:
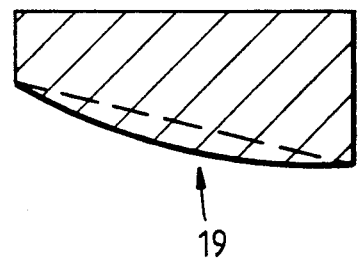
FIG. 10 shows a non-planar facet profile which can be used in the prism means of FIG. 4.

In the described embodiment the prism facets are assumed to be planar. However, this is unlikely to produce the optimum result in terms of uniformity or 'squareness' of the characteristic contours. Thus, a non-planar facet profile may be adopted, tailored to meet specific design requirements. FIG. 10 shows an example, in a sectional plane identical to plane V—V in FIG. 4. The previous planar facet profile is shown by the dotted line. The modified facet 19 has a surface which is curved about one axis, perpendicular to the paper. This profile has the effect of making the prism angle 6 smaller for rays at large angles to the fibre axis, giving a sharper fall-off in the response, which effectively increases the proportion of the total output occupied by the uniform region. The curvature, is exaggerated in FIG. 10 and will in general be quite 'weak', i.e., slight.

It will be appreciated that the prism facets do not need to be on the side facing the end of the fibre. For example, the prism means could be inverted from the position shown in FIGS. 5 and 6. Indeed, the facets are not essentially all formed on the same major face of the prism.

The modification of the radiation characteristic of a fibre using a prism means as described above is dependent upon the prism angle $\theta$, which with the prism refractive index determines the angular deviation of incident light rays, and the distance d of the prism from the fibre end. By analysis or by ray tracing, optimum values of these two parameters can be found which produce a substantially flat response over a defined region. Increasing the prism angle $\theta$, and correspondingly reducing the prism distance d, increases the size of the uniform region, but reduces the average illumination within that region. For example, compare the 'optimum' characteristic in FIG. 9 with that for the unmodified fibre in FIG. 2. In FIG. 9, the peak level is only 35% of that for the unmodified fibre. However, within a square of 45° side, i.e. considering all radiation at angles of up to 22.5° to the fibre axis, the level never falls below 70% of this peak value, i.e. 24.5% of the unmodified peak value. In contrast, the unmodified fibre (FIG. 2) has an output which is only 12% of its peak value at the corners of a 45° square. Thus, the absolute response of the modified fibre is twice that of the unmodified fibre at these corners.

Figure 11:
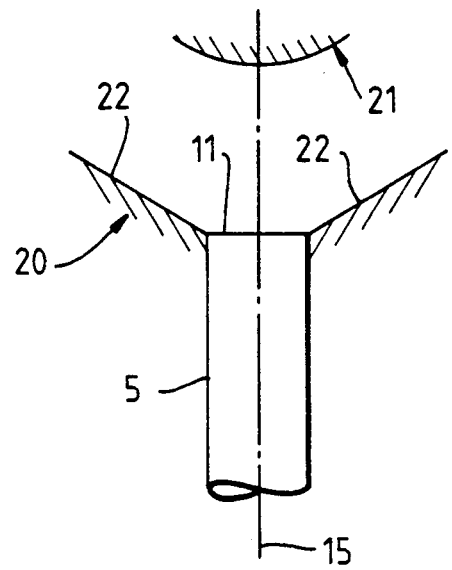
FIG. 11 shows an alternative embodiment of the invention which uses mirrors in place of prism means.

The optical component is not essentially a prism means. A suitably faceted component adapted to distribute radiation within the region of uniform output by refraction and/or specular reflection may be used. For instance, the component may comprise an array of lens facets, which, in the case of a square region, suitably comprises four, preferably formed as an integral, moulded component, disposed symmetrically about the fibre axis. Alternatively, a pair of mirrors may be employed in a Cassegrain arrangement, as shown, by way of example only, in FIG. 11. Here a multi-faceted primary mirror 20 surrounds the fibre end 11 and faces a secondary mirror 21 adjacent the fibre end. The secondary mirror 21 and the primary mirror facets 22 may each be either planar or curved. Light is transmitted between the fibre and space by sequential reflection of rays at the two mirrors. It will be appreciated that the secondary mirror may be faceted instead of the primary mirror and also that the secondary mirror should be small to avoid obstructing light reflected from the primary mirror. Other faceted prism, lens and mirror arrangements capable of achieving the same effect will occur to those skilled in the art.

Whereas throughout this description reference has been made to the fibre providing illumination, it will be appreciated that the invention is equally applicable to the collection of light by the fibre. Moreover, as mentioned previously, the or each individual fibre may be replaced by a bundle of fibres and the composite output of each such bundle treated as if it originated from a single fibre. Furthermore, although reference has been made to the transmission of light by the fibre, the radiation may be in the infrared part of the spectrum. In this case, the optical fibre is suitably an infrared transmitting optical fibre or a hollow light guide.

It is noted that, while non-circularly-symmetric optical arrangements are known, it is the faceted nature of arrangements according to the present invention to which the achieved results are attributed.

I claim:

1. An optical fibre arrangement, comprising: an optical fibre having a fibre axis and a fibre end; and optical means for refracting or reflecting radiation transmitted by said fibre, said optical means being positioned adjacent said fibre end of said fibre to modify a radiation characteristic of the fibre for both transmitted and received radiation, said optical means comprising a plurality of faceted elements arranged to produce the radiation characteristic different in different planes containing the fibre axis and of substantially constant magnitude throughout a non-circular region beyond said fibre end of the fibre.

2. The arrangement according to claim 1, wherein said faceted elements are provided by prism means adapted to distribute radiation within said region.

3. An arrangement according to claim 2, wherein each faceted prism element is adapted to deflect a respective part of the radiation within said region according to the angular direction of said part with respect to said fibre axis.

4. An arrangement according to claim 3, wherein said faceted prism elements are planar.

5. An arrangement according to claim 3, wherein said region is polygonal and said prism means has a number of facets equal to the number of sides of the polygon.

6. An arrangement according to claim 5, wherein said polygon is a square, said prism means having four said facets.

7. An arrangement according to claim 1, wherein said region is planar and normal to said fibre axis.

8. An arrangement according to claim 7, wherein said region has substantially the shape of a polygon.

9. An arrangement according to claim 8, wherein said polygon is a regular polygon.

10. An optical fibre assembly according to claim 1, comprising a bundle of optical fibres the fibre-ends of said bundle being spaced from said optical means by one-half to two diameters of said bundle.

11. An assembly according to claim 10, wherein said larger region is non-planar.

12. An assembly according to claim 11, wherein said larger region is spherical or part-spherical, said non-circular regions comprising an array of complementary pentagons and hexagons.

13. An optical fibre assembly comprising a plurality of optical fibre arrangements, each according to claim 1, wherein the optical fibres are spaced apart from one another in such manner that their respective non-circular regions extend continuously throughout a larger region.

14. An assembly according to claim 13, wherein said non-circular regions do not all have the same shape.

15. An arrangement according to claim 1, wherein said optical means comprises faceted lens means adapted to distribute radiation within said region.

16. An arrangement according to claim 1, wherein said optical means comprises faceted mirror means adapted to distribute radiation within said region.

17. An arrangement according to claim 1, wherein the spacing between said optical means and said end of the fibre lies in the range of one half to two fibre diameters.

* * * * *